(12) United States Patent
Anderson

(10) Patent No.: US 6,636,924 B1
(45) Date of Patent: Oct. 21, 2003

(54) MULTIPLE PORT I²C HUB

(75) Inventor: Alma Anderson, Rio Rancho, NM (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 483 days.

(21) Appl. No.: 09/641,177

(22) Filed: Aug. 17, 2000

(51) Int. Cl.⁷ .......................... G06F 13/38; G06F 13/40
(52) U.S. Cl. ...................... 710/305; 710/125; 710/128; 710/62
(58) Field of Search ................................ 710/1, 30, 31, 710/32, 300, 113, 242, 118, 305, 125, 2, 29, 58, 62

(56) References Cited

U.S. PATENT DOCUMENTS

| | | | |
|---|---|---|---|
| 4,922,409 A | * 5/1990 | Schoellkopf et al. | 710/316 |
| 5,345,447 A | 9/1994 | Noel | |
| 5,528,765 A | * 6/1996 | Milligan | 710/107 |
| 5,592,632 A | * 1/1997 | Leung et al. | 710/316 |
| 6,006,275 A | * 12/1999 | Picazo et al. | 709/249 |
| 6,275,864 B1 | * 8/2001 | Mancusi et al. | 709/250 |
| 6,359,894 B1 | * 3/2002 | Hong et al. | 370/402 |
| 6,405,299 B1 | * 6/2002 | Vorbach et al. | 712/11 |
| 6,418,481 B1 | * 7/2002 | Mancusi et al. | 709/250 |

OTHER PUBLICATIONS

Philips Semiconductors: "PCA9516 5–channel I²C Hub" Online! Dec. 4, 2000, Philips Electronics North America Corporation, USA XP002190570 http://www.semiconductors.philips.com/pip/pca9516d.

* cited by examiner

Primary Examiner—Jeffrey Gaffin
Assistant Examiner—Angel L. Casiano
(74) Attorney, Agent, or Firm—Michael Schmitt

(57) ABSTRACT

A multiport device is configured to recognize each active segment on a bus, and to selectively propagate signals within the device depending upon whether the segment is active. Optimal signal propagation is achieved by invoking the control of the propagation of signals only after a first active-transition on the bus. Initial transitions are propagated unconditionally, to minimize propagation delay, and subsequent signal propagations are conditionally controlled, to avoid latch-up. A latch is associated with each port. The latch is set each time the port is actively driven by a device on that port. The latch is reset when all the devices are in the quiescent state, or when another port remains active after the currently active port becomes inactive. The state of each port's latch controls the propagation of internally generated signals to the port. If the latch is set, internally generated signals are not propagated to the port, thereby preventing latch-up. If the latch is not set, both internally generated signals and externally generated signals are propagated to the port, thereby minimizing propagation delays.

18 Claims, 4 Drawing Sheets

MULTIPLE PORT I²C HUB

CROSS REFERENCE TO RELATED APPLICATIONS

The present application is related to the inventor's U.S. Pat. No. 6,362,654, "BIDIRECTIONAL REPEATER USING HIGH AND LOW THRESHOLD DETECTION", issued Mar. 26, 2002, and U.S. Pat. No. 6,433,622, "VOLTAGE STABILIZED LOW LEVEL DRIVER", issued Aug. 13, 2002.

BACKGROUND OF THE INVENTION

1. Field of the Invention

This invention relates to the field of electronics, and in particular to a device that facilitates the interconnection of devices using an I²C interface.

2. Description of Related Art

The Inter Integrated Circuit (I²C) bus developed by Philips Corporation allows integrated circuits to communicate directly with each other via a simple bi-directional 2-wire (plus ground) bus. A device connects to each of the two wires on the bus, one (SData) for the communication of data, and the other (SClk) for the control and synchronization of the communication of data between the devices. Each device is connected in parallel to each of the other devices, and each of the bus lines, SData and SClk, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

To facilitate a high speed data transfer, the I²C specification limits the maximum capacitive loading on the bus, thereby limiting the maximum length of the bus. The specified maximum capacitive loading is 400 pf, which limits the bus length to a few meters. The 82B715 integrated circuit from Philips Semiconductors is an I²C bus extender that allows for routing of the bus beyond the specified maximum length. The 82B715 offers a current gain of ten from the input to the output, thereby providing a capacitive reduction of ten to the bus on the input side of the bus extender. By placing a bus extender at each end of a long length of wire, only one tenth of the capacitance of the wire appears as a load to the I²C bus or device at each end of the long length of wire. The current buffering also preserves the bi-directional, open-collector/open-drain characteristics of the I²C bus.

A hub is distinguished from an extender in that a hub is conventionally defined as a device that distributes a signal to multiple devices. For example, on a printed circuit board, a hub may be centrally placed among a variety of devices that communicate via the bus. From this central location, the bus is distributed to each device, preferably via a driver on each port of the bus that drives a corresponding segment of the bus. In this manner, the length of each segment of the bus, from the hub to the devices, is reduced, relative to one continuous length of wire extending to all devices, and the bus loading is distributed among the hub drivers.

In a bi-directional configuration, wherein the same wire is used to both transmit and receive, a hub appears as a collection of input ports that each fan out to a driver at every other port. Because the output of the driver at a port shares the same node as the input from the devices on that port's segment of the bus, and the input fans out to every other driver, a bi-directional hub must be configured to distinguish an externally generated event on the bus segments from an internally generated event, to preclude a latch-up. Such a latch-up is caused when an input event that is propagated from one port is interpreted as an input event from another port, and re-propagated to the originating port from the other port. When the originator of the event ceases the event, this cessation must be propagated to all the ports.

Conventional bi-directional hubs typically include control logic that determines which port is receiving a driving signal, and thereafter blocks any input from any other port from being propagated to any port. That is, the conventional hub selectively enables only one port as a receiving port, and forces all other ports to a transmit state, wherein these other ports transmit the data received at the receiving port to their corresponding bus segments. Because only one port is enabled for receiving and propagating a signal at any one time, the possibility of a latch-up is avoided. Note, however, that this selective enabling of one port at a time presupposes that only one port may be active at any point in time, or, if two ports are active, the first port to be active prevails.

Preferably, a hub is "transparent" to devices on the bus. That is, although a hub allows for improved bus performance, its presence on the bus should be undetectable. If the bus without the hub is a wired-AND bus, for example, when any device pulls the bus low, the entire length of the bus is brought to the low state. If multiple devices pull the bus low, the bus will remain low until the last device ceases to assert the low voltage. A conventional hub that only reacts to one port at a time will often introduce transition behavior as it disables the current receiving port, and then enables another port as the receiving port. Because only one port at a time is enabled as a receiving port, the hub is unaware that another segment of the bus is also being driven low until it attempts to bring the bus to a high level. The segment being driven low will remain low, but other segments will be allowed to rise to the high level until the port that is being driven low is enabled as the sole receiving port. Some specifications, and in particular the I²C specification, rely upon a consistent performance in the presence of a simultaneous assertion of the active state by more than one device. In the I²C specification, for example, the synchronization of the clock signal among multiple devices is determined by the time that a first device pulls the bus low, and the time that a last device ceases pulling the bus low.

BRIEF SUMMARY OF THE INVENTION

It is an object of this invention to provide a multiport device that facilitates a multiple fanout of an open-collector/open-drain bus while also providing for a high-speed data transfer. It is a further object of this invention to provide a multiport device that maintains the bus control protocol of an I²C bus. It is a further object of this invention to provide a multiport device that minimizes propagation delays.

These objects and others are achieved by providing a multiport device that is configured to recognize each active segment on the bus. The propagation of signals from each port to each other port is controlled by state of each segment. Optimal signal propagation is achieved by invoking the control of the propagation of signals only after a first active-transition on the bus. Initial transitions are propagated unconditionally, to minimize propagation delay, and subsequent signal propagations are conditionally controlled, to avoid latch-up. A latch is associated with each port. The latch is set each time the port is actively driven by a device on that port. The latch is reset when all the devices are in the quiescent state, or when another port remains active after the currently active port becomes inactive. The state of each port's latch controls the propagation of internally generated signals to the port. If the latch is set, internally generated signals are not propagated to the port, thereby preventing latch-up. If the latch is not set, both internally generated signals and externally generated signals are propagated to the port, thereby minimizing propagation delays.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
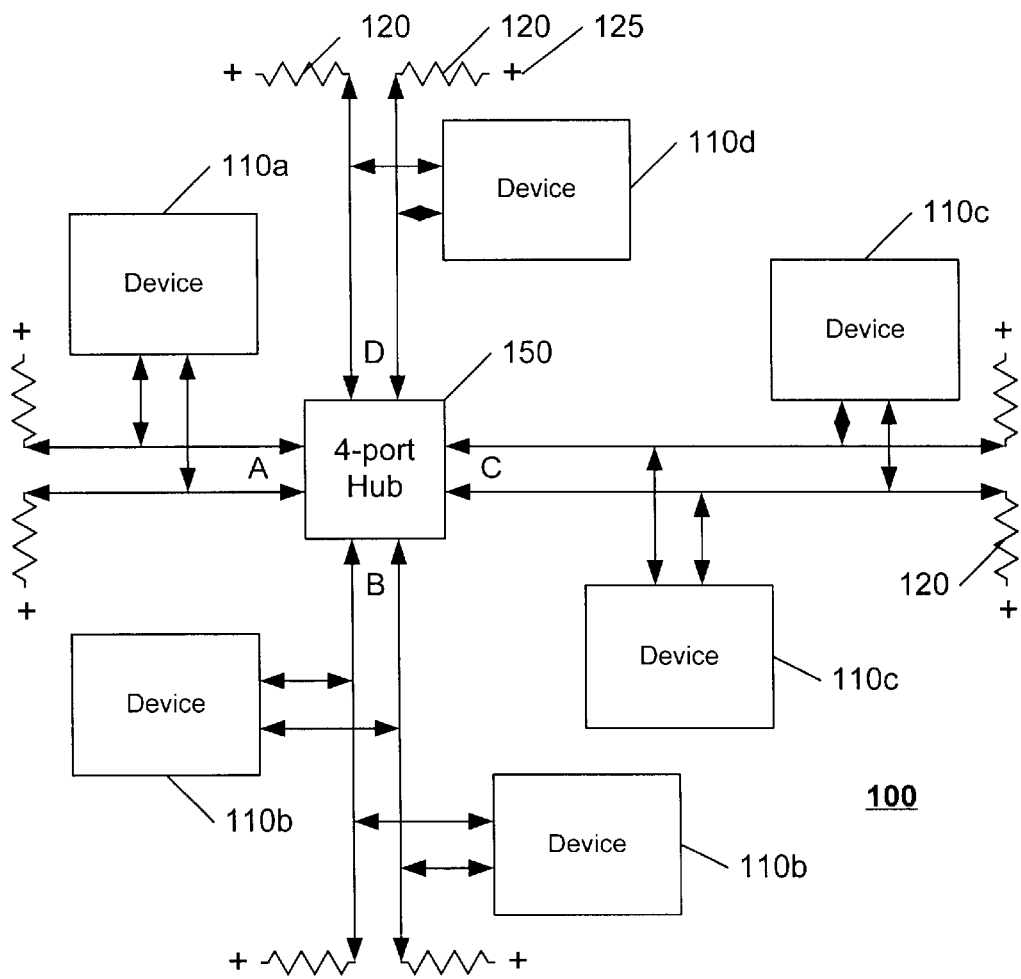
FIG. 1 illustrates an example block diagram of an I²C system with a multiport hub in accordance with this invention.

FIG. 1 illustrates an example block diagram of an I²C system 100 with a multiport hub (4-port hub) 150 in accordance with this invention. Although the I²C is used as a paradigm for a bi-directional bus system, and although the I²C bus uses a wired-AND logic structure for communicating on the bus, one of ordinary skill will recognize that this invention is not limited to a wired-AND configuration nor to an I²C bus structure. Complementary structures, for use in a wired-OR configuration will be evident to one of ordinary skill in the art.

In the I²C bus structure, external devices 110 communicate via two buses, a data bus, and a clock bus. In a quiescent state, the buses are maintained at a "high" voltage value, nominally +3 to +10 volts. This high, or inactive, or quiescent, voltage is provided by "pullup" resistors 120 that connect the bus to a positive supply voltage 125. FIG. 1 illustrates four segments of the bus connected to the 4-port hub 150, each segment being identified as ports A, B, C, and D on the hub 150. A 4-port hub is presented herein for illustrative purposes; any number of ports may be embodied in a multiport hub in accordance with the principles of this invention. The devices on the bus are identified as devices 110a, b, c, and d, corresponding to the port to which they are attached. Communication via the bus is effected by driving the bus to a low voltage state to signify the active state, and releasing the bus, allowing it to rise to the high voltage state, to signify the inactive state. Each of the devices on the bus is configured as open-collector or open-drain devices, that provide a high impedance path (preferably infinite impedance) to the positive voltage 125, and a switchable low impedance path to ground. If any device 110 pulls the bus to a low voltage, all of the devices on the same segment of the bus will be brought to this same low voltage. The hub 150 is designed to propagate this low voltage to the devices on the other segments of the bus. If and only if all devices 110 are in an in-active state, wherein they are not driving the bus low, will all the segments of the bus be permitted to rise to the high voltage 125. In effect, the hub 150 is configured to propagate the active state from any device to every other device, and to allow the bus to return to the inactive state when no device asserts the active state.

Figure 2:
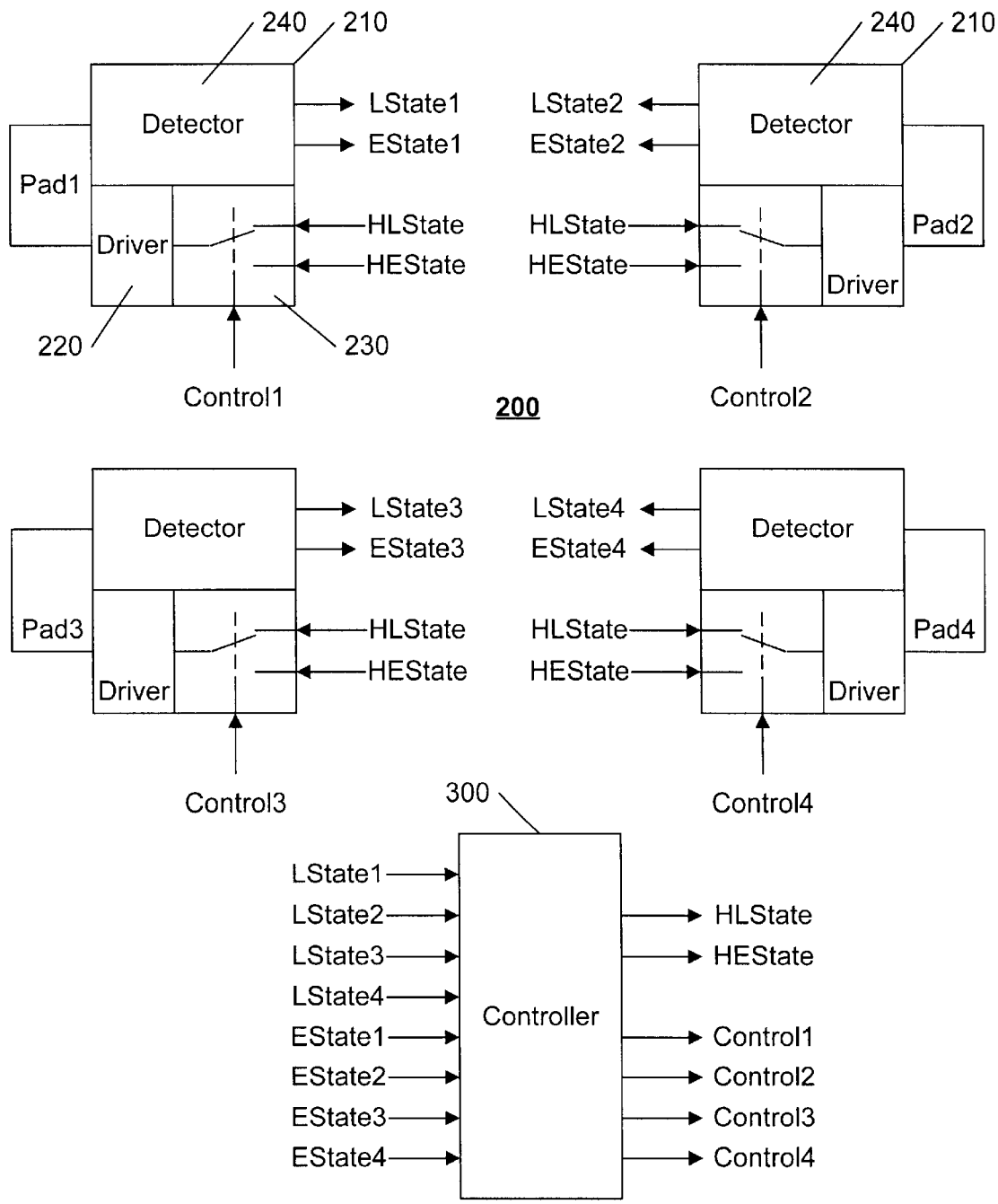
FIG. 2 illustrates an example block diagram of a multiport hub in accordance with this invention.

FIG. 2 illustrates an example block diagram of a multiport hub 200 in accordance with this invention. In an I²C environment, a pair of hubs 200 form the hub 150 of FIG. 1, to independently provide a hub function to each of the data bus and the clock bus.

Each port of the multiport hub 200 has an associated port handler. Four port handlers are illustrated in FIG. 2, although any number of ports can be provided. Each port handler 210 includes a driver 220 that drives an associated segment of the bus, commonly via a pad or other connection means to the hub 200. The driver 220 is also coupled, via the port's bi-directional connection to external devices (110 in FIG. 1), to a detector 240 that senses the logic state of the associated segment of the bus, regardless of whether the bus is being driven by the driver 220 or an external device. Because internally generated signals (from the driver 220) are communicated via the same media as externally generated signals (from devices 110), the detector 240 must distinguish between internally and externally generated signals, to avoid latch-up when internally generated signals are propagated back to the originating driver, as discussed above.

The detector 240 at each port distinguishes between an internally generated signal, and an externally generated signal. A variety of techniques, common in the art, are available for distinguishing between internally and externally generated signals. The aforementioned 82B715 bus extender, for example, uses current sinking and sensing to distinguish the source of a signal. U.S. Pat. No. 6,362,654 "BIDIRECTIONAL REPEATER USING HIGH AND LOW THRESHOLD DETECTION", issued Mar. 26, 2002 to Alma Anderson and Paul Andrews, discloses a technique for distinguishing between internally and externally generated signals based on a distinguishing threshold voltage, and is incorporated by reference herein. In accordance with this copending application, the driver 220 is configured to limit its output voltage level to a low value that corresponds to a logic-low state, but is above the voltage level that external devices 10 are configured to produce. A threshold voltage is set to be between the voltage level of the driver 220 at the logic-low state, and the voltage level of the external devices 110 at the logic-low state. The detector 240 in this example provides an LState that corresponds to the logic-state of the port, and an EState that corresponds to a logic-low state if and only if the voltage at the port is below the threshold. In this manner, an LState of logic-low and an EState of logic-high signifies that the low voltage at the port is caused by the internal driver 220, and not an external device 110. Correspondingly, an EState logic-low signifies that the low voltage at the port is caused by the external device 110. U.S. Pat. No. 6,433,622 "VOLTAGE STABILIZED LOW LEVEL DRIVER", issued Aug. 13, 2002 to Alma Anderson and Paul Andrews, discloses an embodiment for a driver 220 that provides the required controlled low-voltage at a voltage that is stable over a wide range of conditions, and is incorporated by reference herein.

In each of the known techniques for distinguishing an internally driven event from an externally driven event, the time required to ascertain that the event is truly from an external device is longer than the time required to determine the logic value at a node. For example, in a wired-AND configuration, as soon as the voltage at a node begins to fall from the quiescent voltage, it can be assumed that the decrease represents either a change of logic-state, or noise. Assuming a maximum magnitude of expected noise, as soon as the voltage drops below the quiescent voltage by the maximum noise magnitude, a logic-low value can be assumed. Conversely, the difference between an internally generated signal and an externally generated signal, either of which may be producing the logic-low state, is typically determined by waiting until the node exhibits a particular distinguishing behavior, or not. Therefore, the minimum delay time for determining whether a node is being driven internally or externally is typically equal to or greater than the maximum transition time of either the internal or external device. Further exacerbating the problem, to assure a proper determination of whether the node is driven internally or externally, a worst-case maximum transition time is typically used as a design constraint.

As noted above, if the internally generated signal is fed back to the node that originated the propagation of the internally generated signal, a latch-up can result. Propagating only the externally generated signal eliminates the likelihood of latch-up, but, as discussed above, introduces a substantial propagation delay, to allow time for the detector 240 to distinguish between internally and externally generated signals. In accordance with this invention, to minimize propagation delay, the determined logic-state is propagated as soon as a first logic-low is detected, regardless of the source of this logic-low signal. Thereafter, the port that originated the first logic-low controls the logic state of the hub HLState, and the coupling of this logic-state to the originating port is broken, thereby preventing a latch-up.

A controller 300 controls a switch 230 in each port handler 210, to control the coupling to the corresponding driver 220. In the quiescent state, the control to each of the switches 220 de-asserted, and each driver 220 is coupled to the hub logic state, HLState. The controller 300 determines this hub logic state from the logic state LState of each port handler 210, such that, as soon as a logic-low-state is detected at any port, that change is propagated, via HLState, to all of the port drivers 220. The controller 300 also asserts the control signal for that port's switch 230, thereby decoupling the hub logic state HLState from that port's driver 220. By decoupling the hub logic state HLState from the originating port, latch-up is avoided.

In accordance with another aspect of this invention, when the control signal for a port's switch 230 is asserted, the driver 220 is coupled to a hub external-state HEState. In a wired-AND configuration, the hub external-state HEState is the logical-AND of each of the port's external state EState. By coupling the hub external-state HEState to the originating port, a true wired-AND configuration is maintained. If another external device (110 in FIG. 1), for example, drives another bus segment low while the originating port is being driven low, the originating port will be held at a low state for as long as either one of the ports is being driven low. In like manner, as discussed further below, the controller will also assert the control signal for the port that is being driven by the other external device, so that its driver 220 will be coupled to the hub external state HEState, thereby holding that port at a logic-low state until both ports cease to be driven by external devices.

Figure 3:
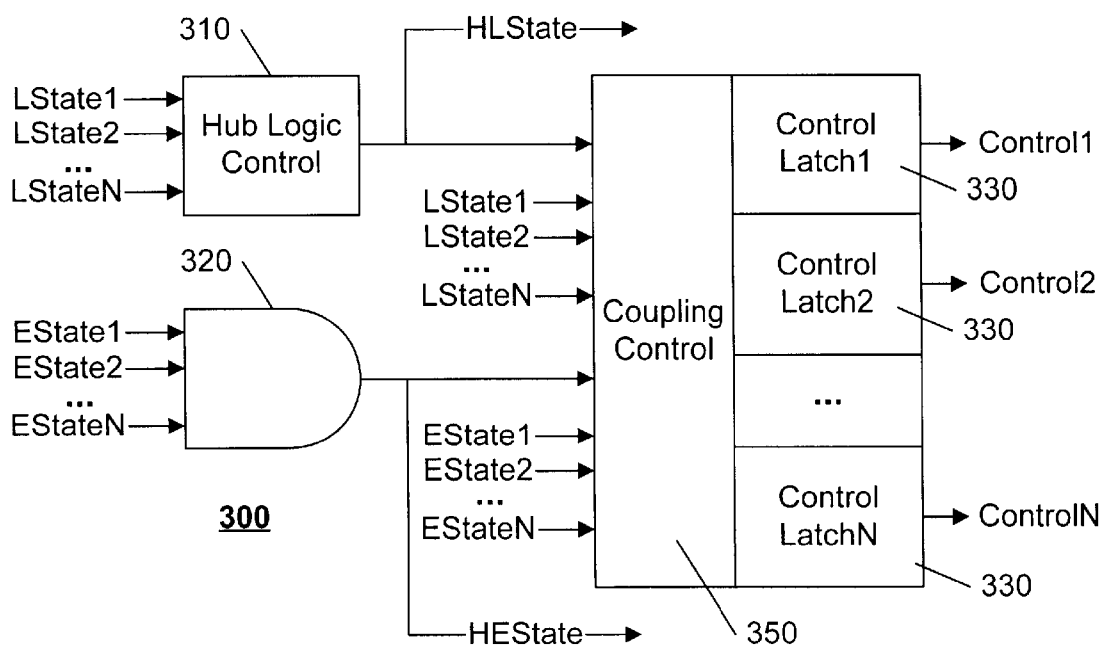
FIG. 3 illustrates an example block diagram of a multiport hub controller in accordance with this invention.

FIG. 3 illustrates an example block diagram of a multiport hub controller 300 in accordance with this invention. The logic blocks 310 and 320 determine the hub logic and external states HLState, HEState, respectively, based on the logic and external state LState, EState, respectively, of each port. The hub logic control block 310 is discussed further below with regard to FIG. 5. As mentioned above, in a wired-AND configuration, the logic block 320 is a logical-AND of the individual external states EState(i) of each of the ports(i) in the hub. As would be evident to one of ordinary skill in the art, if a wired-OR configuration is used, for a non-I$^2$C embodiment, the AND gate 320 would be replaced by an OR gate.

A coupling control block 350 receives each of the LState (i) and Estate(i) signals, as well as the hub signals HLState and HEState, and uses these signals to set or reset control latches 330 that are associated with each port. Each latch 330 determines the corresponding control signal that are used to control the switch (230 in FIG. 2) at each port handler (210 in FIG. 2) to couple or decouple the appropriate hub logic-state or external-state to the corresponding driver (220 in FIG. 2), as discussed above.

Figure 4:
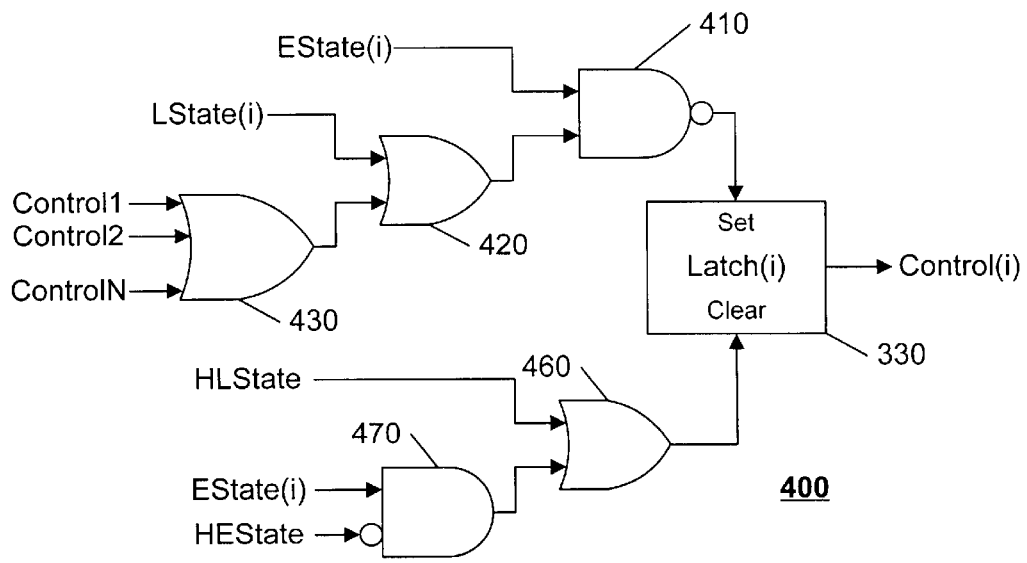
FIG. 4 illustrates an example block diagram of a coupling control cell of a multiport hub controller in accordance with this invention.

FIG. 4 illustrates an example block diagram of a coupling control cell 400 and corresponding controlled latch 330 of a multiport hub controller (300 in FIG. 3) in accordance with this invention. The coupling control block 350 of FIG. 3 functionally comprises a coupling control cell 400 for each of the ports, although some of the logic elements, such as the OR-gate 430, discussed below, may be common to multiple ports.

As discussed above, the control signal Control(i) associated with each port(i) is de-asserted when the bus is in the quiescent state. This is effected by resetting, or clearing, the control latch(i) of each port when the hub logic-state is a logic-high value, via the HLState input to the OR-gate 460.

Also discussed above, whenever it is determined that a port is being driven low by an external device, the control signal Control(i) is asserted. This is effected by setting the control latch(i) of a port(i) whenever the port's external-state EState(i) indicates a logic-low value, via the NAND gate 410.

The control signal Control(i) is also de-asserted when it is determined that the particular port is no longer being driven low by an external source (110 in FIG. 1). If this port is the only port being externally driven low, this de-assertion is effected when the port's logic state changes and the hub logic-state becomes a logic-high, clearing the latch(i) 330 as discussed above. Alternatively, if the port's external-state EState(i) becomes a logic-high while the hub external-state remains at a logic-low state, this indicates that another device is holding the bus low, and this port's latch(i) can be reset. This reset is effected via the logic gate 470 and the OR gate 460.

As discussed above, a transition from the quiescent state at any port(i) is propagated to all ports from the first port that detects this transition. To avoid latch-up, this first port(i) is configured to decouple the hub logic state HLState from its driver, via the control signal Control(i). This is effected by setting the latch(i) 330 whenever the detected logic state LState(i) of the port(i) becomes low, and none of the other ports have yet been set, via the OR gates 430 and 420, and NAND gate 410, indicating that this is the first port to have detected the logic-low signal, and thus must be externally driven.

Figure 5:
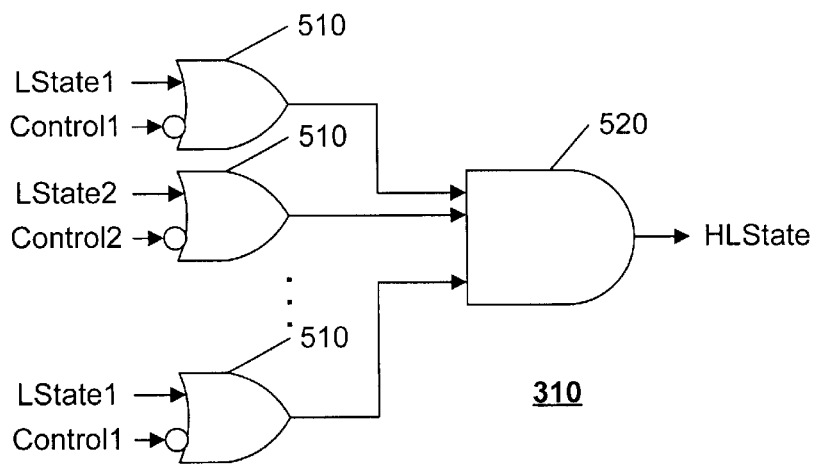
FIG. 5 illustrates an example block diagram of a control block for determining an aggregate hub logic state of a multiport hub in accordance with this invention.

FIG. 5 illustrates an example block diagram of the logic control block 310 for determining the aggregate hub logic state HLState of the multiport hub 200 of FIG. 2 in accordance with this invention. The logic gates 510 each determine whether the associated port is a controlling port, and the AND gate 520 provides a hub logic-state that corresponds to the one or more controlling port's logic state LState. In the quiescent, logic-high state, the logic state LState of each port is high, and thereby the hub logic state HLState is high. When the HLState is high, each of the control latches 330 of FIGS. 3 and 4 are reset, via the OR-gate 460 in FIG. 4, bringing each of the coupling control lines associated with each port to a logic-low level. This logic-low level on the inverted control input to the logic gate 510 desensitizes each gate 510 to the logic state LState of each corresponding port by forcing the output of the gate 510 to a logic-high state regardless of the LState input.

When a first logic-low event occurs at a port(i), the port's detector 240 (FIG. 2) provides a logic-low LState(i) output. This logic-low LState(i) sets the corresponding port control signal Control(i) to a logic-high state, via the gates 420 and 410 of FIG. 4. Note that as noted above, in the quiescent state, all of the control signals are reset to a logic-low, and therefore the output of the logic gate 430 is also at a logic-low value, thereby sensitizing the gate 420 to LState (i). The initial logic-low LState(i) and the subsequent logic-high Control(i) corresponding to the originating port(i) cause the corresponding hub logic control gate 510 to go to a logic-low state, forcing the hub logic state HLState to a logic-low state, via the gate 520. This logic-low hub logic state HLState is propagated to all ports, except the originating port, via the controlled switch 230 and driver 220 of each port.

Note that although the detector 240 at each port will subsequently detect a logic-low LState(i), these logic states will have no effect on the hub logic state HLState, because each of the gates 510 are desensitized to the corresponding port's LState until the corresponding control signal for that port is asserted. As noted above, if a second port is subsequently driven to a logic-low value via an external source (110 in FIG. 1), that port's external state EState will reflect this logic-low state, and the port's control latch will be set, via the gate 410 in FIG. 4. Thereby, the corresponding gate 510 will be sensitized to the port's logic value LState, and the gate 520 will hold in the hub logic state HLState at logic-low until all of the driven ports return to the logic-high state. In this manner, the hub logic state HLState corresponds to a true wired-AND of each of the driven ports' logic values LState. A corresponding complement of the logic of FIGS. 3–5, well within the skill of one of ordinary skill in the art, will provide for a wired-OR embodiment, as required.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the particular logic configuration and parameters may be modified without affecting the principles of operation of the invention. For example, the detector 240 of each port handler 210 may be configured to provide an indication of whether or not the logic-state LState is provided by an external device, rather than indicating the external-state directly. Similarly, the controller 300 is illustrated as a separate block from the port handlers, for ease of understanding, whereas its function could be distributed among each of the port handlers 210. That is, for example, each port handler 210 could include the control logic cell 400 and latch 330 associated with each port. These and other system configuration and optimization features will be evident to one of ordinary skill in the art in view of this disclosure, and are included within the scope of the following claims.

We claim:

1. A multiport hub for a bus comprising:

a plurality of port handlers,
  each port handler corresponding to a port of the multiport hub, and each port handler comprising:
    a port driver,
    a detector that is configured to detect an external state and a logic state at a corresponding port; and a controller, operably coupled to each of the plurality of port handlers, that is configured to:
  determine a hub logic state based on the logic state from each of the port handlers,
  determine an hub external state based on the external state from each of the port handlers, and
  determine a control state for each of the port handlers, wherein the control state for each of the port handlers:
  selectively decouples the hub logic state from the port driver of the corresponding port handler, thereby avoiding latch-up,
  couples the hub external state to the port driver of the corresponding port handler, thereby assuring propagation of the external state to each of the ports, and
  selectively couples the hub logic state to the port driver of the corresponding port handler, thereby minimizing a propagation delay.

2. The multiport hub of claim 1, wherein the control state of each port handler:
  decouples the hub logic state to the corresponding port driver in dependence upon the external state of the port handler, and
  couples the hub logic state to the corresponding port driver in dependence upon the hub logic state.

3. The multiport hub of claim 1, wherein the hub external state is the logical-AND of the external state of each of the port handlers, and the hub logic state is the logical-AND of the logic state of each of the port handlers that are determined to be externally driven.

4. The multiport hub of claim 1, wherein the logic state of each of the port handlers is inclusive of the external state of each port handler, and thereby the multiport hub unconditionally propagates the external state of each port to each other port, and conditionally propagates the logic state of each port.

5. The multiport hub of claim 1, wherein the hub conforms to the I²C specification.

6. The multiport hub of claim 1, wherein the detector comprises a first detector and a second detector, the first detector has a first propagation delay that is substantially longer than a second propagation delay of the second detector, and the controller is configured to couple each of the port drivers to the hub logic state during each inactive phase of the bus, thereby providing an overall propagation delay through the hub that is based on the second propagation delay, and not the first propagation delay.

7. The multiport hub of claim 1, further comprising:

a replication of the plurality of port handlers and controller, to provide hub functionality for a two-wire bus system.

8. The multiport hub of claim 7, wherein the two-wire bus system is an I²C bus.

9. The multiport hub of claim 1, wherein
the detector comprises a first detector and a second detector,
the logic state and the external state at each corresponding port are distinguished based on a voltage-threshold difference between the first detector and the second detector.

10. A system comprising:
a bus that is partitioned into a plurality of bus segments,
a plurality of devices, each device being operably coupled to a segment of the plurality of bus segments, and
a hub that is configured to couple each of the plurality of bus segments, thereby coupling each of the plurality of devices, wherein
the hub is configured to
unconditionally propagate an active signaling from one or more of the plurality of bus segments to each other of the plurality of bus segments, and
conditionally propagate an internally determined logic value to each of the plurality of bus segments wherein:
the logic value is propagated immediately after a change from a quiescent state of the bus, thereby minimizing propagation delay, and
the logic value is prevented from propagation to the one or more of the plurality of bus segments in dependence upon the active signaling from the one or more of the plurality of bus segments, thereby avoiding latch-up.

11. The system of claim 10, wherein the hub comprises:
a plurality of port handlers,
each port handler being associated with a corresponding segment of the plurality of bus segments, and comprising:
a port driver,
a detector that is configured to detect:
a logic state at a corresponding port, and
an external state at the corresponding port,
the external state corresponding to the active signaling on the corresponding segment of the plurality of bus segments,
a controller, operably coupled to each of the plurality of port handlers, that is configured to:
determine an hub logic state based on the logic state from each of the port handlers,
determine an hub external state based on the external state from each of the port handlers, and
determine a control state for each of the port handlers, wherein
the control state for each of the port handlers:
selectively decouples the hub logic state from the port driver of the corresponding port handler, thereby avoiding latch-up, and
couples the hub external state to the port driver of the corresponding port handler, thereby assuring propagation of the external state to each of the port handlers.

12. The system of claim 11, wherein
the control state of each port handler:
decouples the hub logic state to the corresponding port driver in dependence upon the external state of the port handler, and
couples the hub logic state to the corresponding port driver in dependence upon the hub logic state.

13. The system of claim 11, wherein the system employs a plurality of independent buses, and the hub further comprises one or more replications of the controller and the plurality of port handlers to facilitate the coupling of the plurality of devices via the plurality of independent buses.

14. The system of claim 10, wherein
the logic state of each of the port handlers is inclusive of the external state of each port handler, thereby providing the unconditional propagation of the active signaling from the one or more of the plurality of bus segments to each other of the plurality of bus segments.

15. The system of claim 10, wherein the system conforms to the I²C specification.

16. The system of claim 10, wherein
the detector comprises a first detector and a second detector,
the first detector has a first propagation delay that is substantially longer than a second propagation delay of the second detector, and
the controller is configured to couple each of the port drivers to the hub logic state during each inactive phase of the bus, thereby minimizing the propagation delay.

17. The system of claim 10, wherein
each device provides the active signaling below a first threshold level, and
each hub provides the logic value above the first threshold level and below a second threshold level, to facilitate a distinction between signals that are provided by each device from signals that are provided by each hub.

18. A method of propagating active signaling among a plurality of segments of a bus, comprising:
detecting an active logic state associated with each segment of the plurality of segments,
propagating the active logic state to each of the plurality of segments,
determining whether the active logic state originated at each of the segments of the plurality of segments, and
selectively decoupling the propagation of the active logic state from each of the segments of the plurality of segments that are determined to have originated the active logic state.

* * * * *